T. RHODUS.
VEHICLE WHEEL.
APPLICATION FILED FEB. 15, 1915.
1,159,092.
Patented Nov. 2, 1915.
4 SHEETS—SHEET 1.
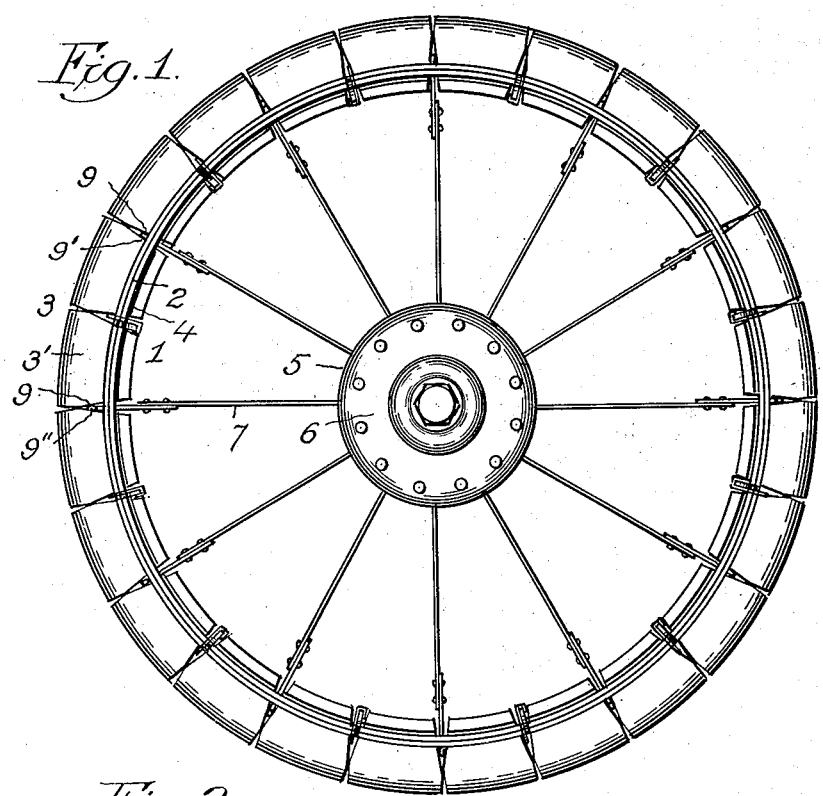
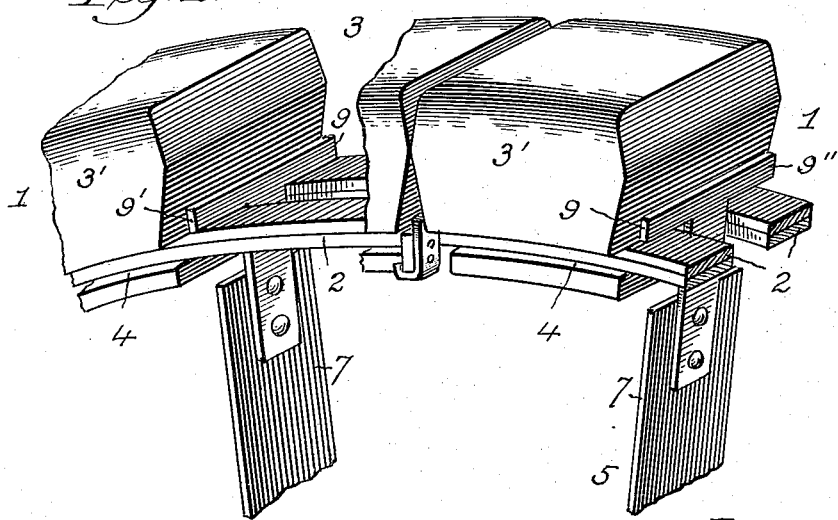
Witnesses.
John Enders
W. H. Holmes
Inventor:
Thomas Rhodus,
by
Robert Burns
Atty.

T. RHODUS.
VEHICLE WHEEL.
APPLICATION FILED FEB. 15, 1915.
1,159,092.
Patented Nov. 2, 1915.
4 SHEETS—SHEET 2.
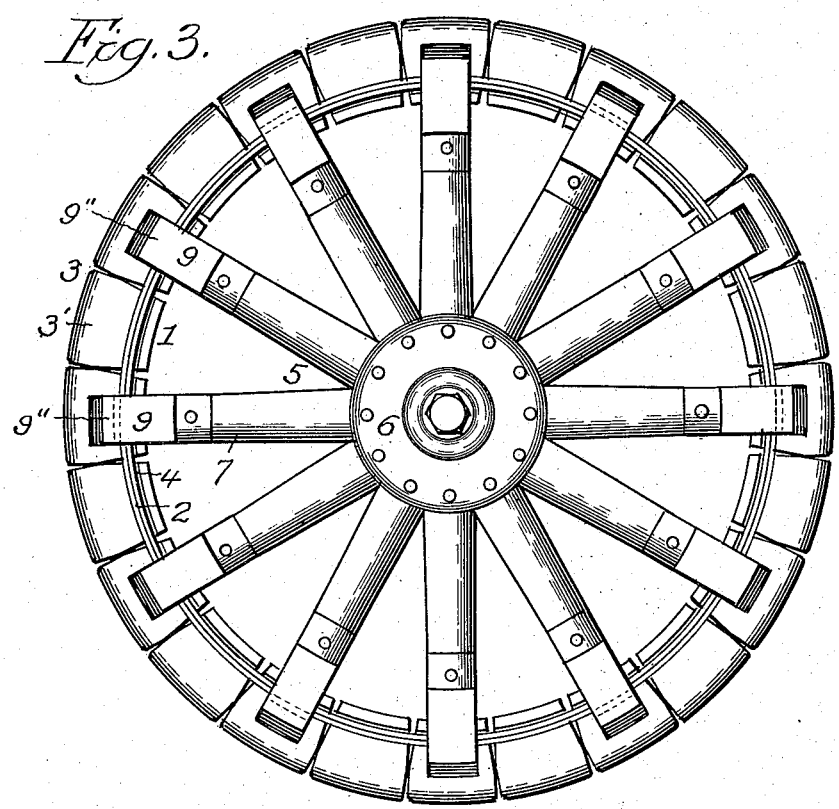
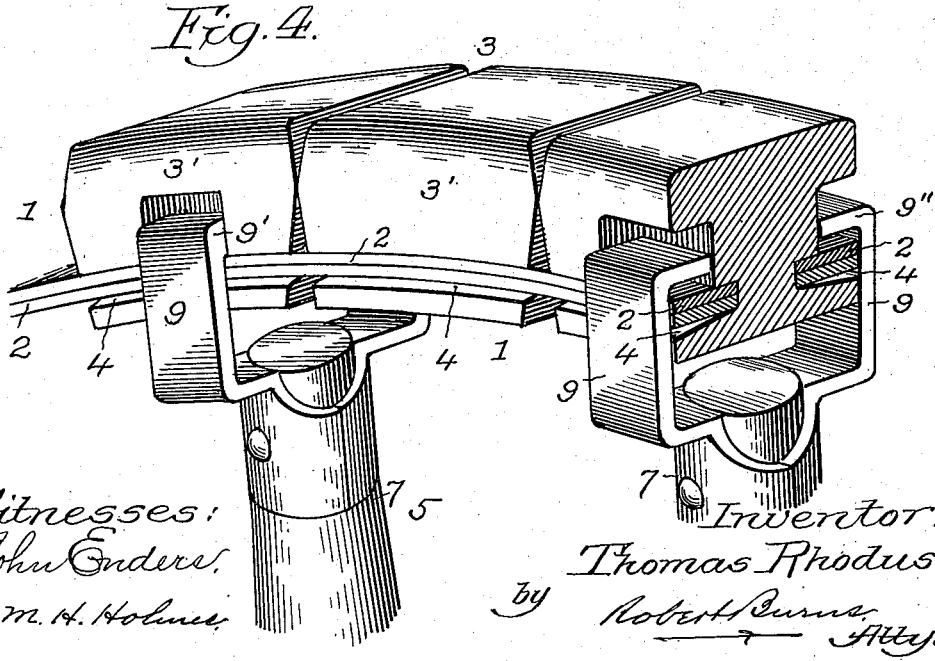
Witnesses:
John Enders,
M. H. Holmes.
Inventor:
Thomas Rhodus,
by Robert Burns,
Atty.

T. RHODUS.
VEHICLE WHEEL.
APPLICATION FILED FEB. 15, 1915.
1,159,092.
Patented Nov. 2, 1915.
4 SHEETS—SHEET 3.
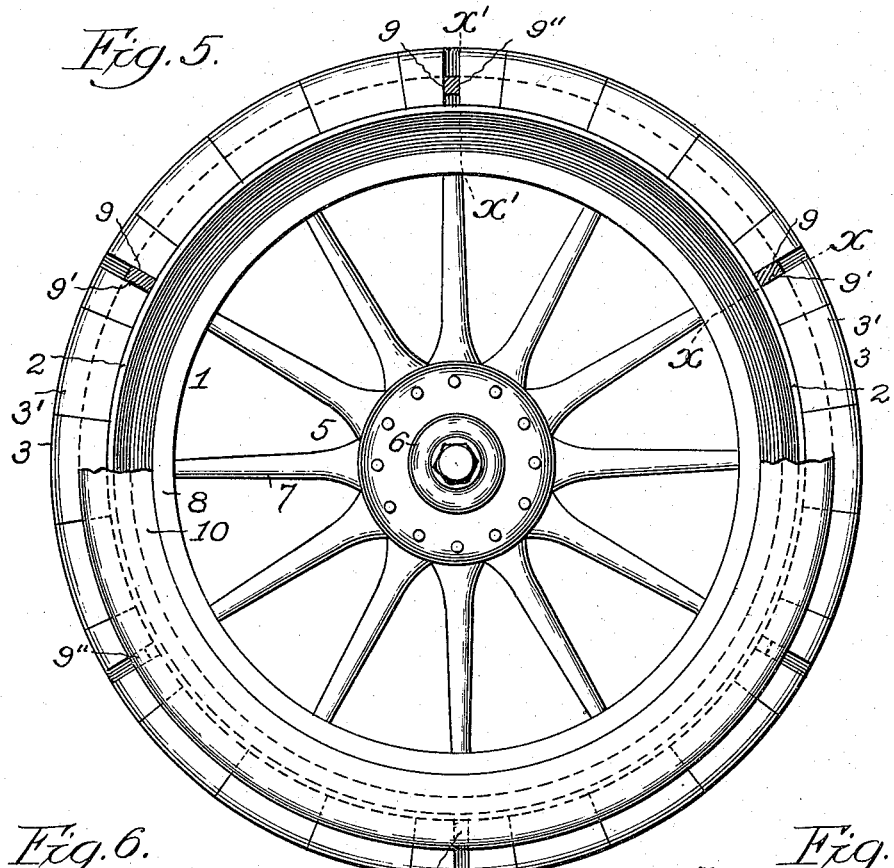
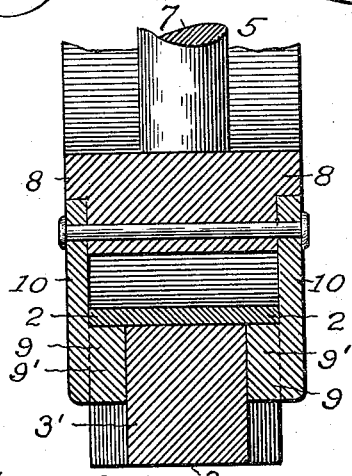
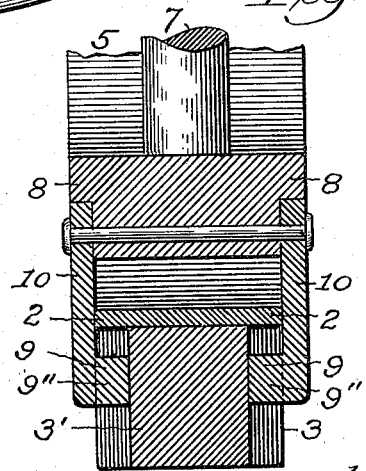
Witnesses:
John Enders
M. H. Holmes
Inventor:
Thomas Rhodus,
by Robert Burns
Atty.

T. RHODUS.
VEHICLE WHEEL.
APPLICATION FILED FEB. 15, 1915.
1,159,092.
Patented Nov. 2, 1915.
4 SHEETS—SHEET 4.
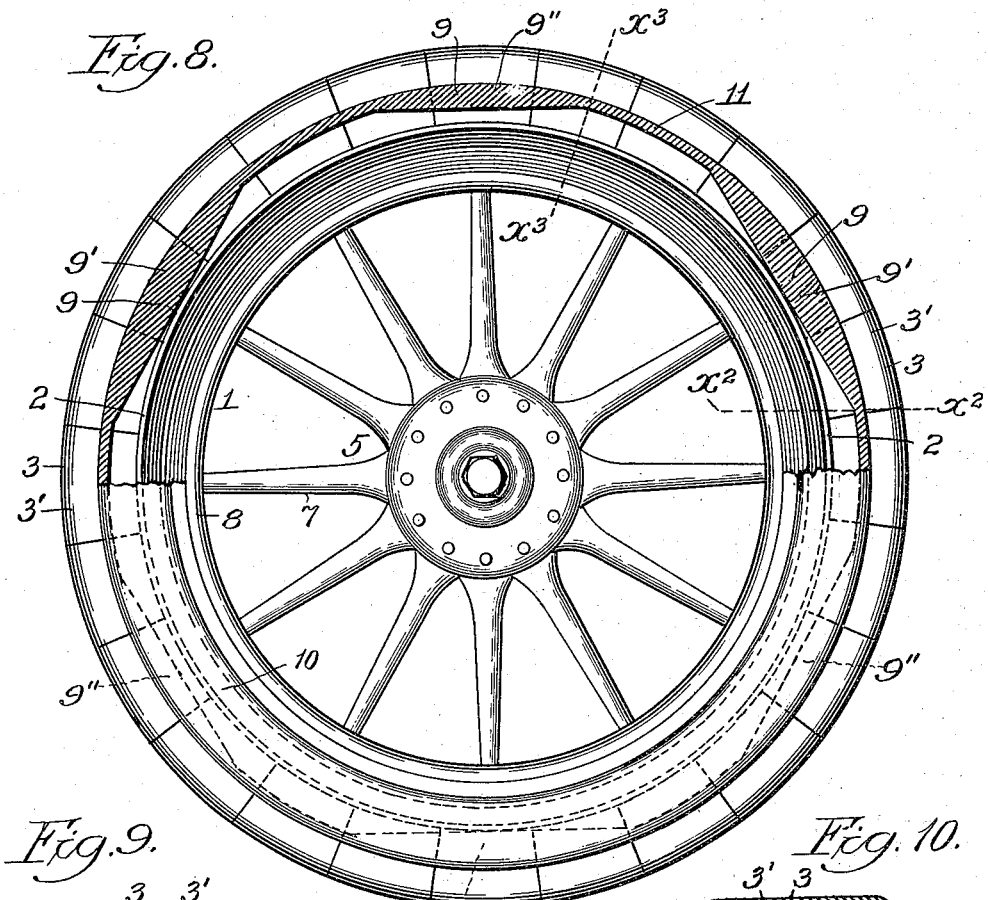
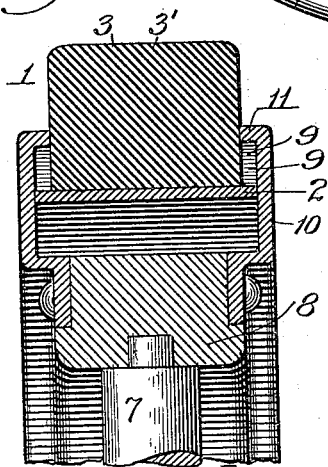
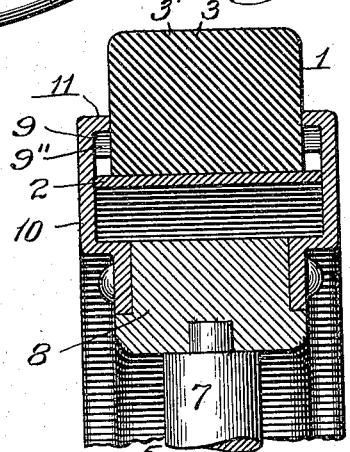
Witnesses:
John Enders.
M. H. Holmes.
Inventor:
Thomas Rhodus,
by Robert Burns.
Atty.

UNITED STATES PATENT OFFICE.

THOMAS RHODUS, OF CHICAGO, ILLINOIS.

VEHICLE-WHEEL.

1,159,092.   Specification of Letters Patent.   Patented Nov. 2, 1915.

Application filed February 15, 1915. Serial No. 8,193.

*To all whom it may concern:*

Be it known that I, THOMAS RHODUS, a citizen of the United States of America, and a resident of Chicago, in the county of Cook and State of Illinois, have invented certain new and useful Improvements in Vehicle-Wheels, of which the following is a specification.

This invention relates to that type of resilient rim wheels in which the tread of the wheel is of a flexible nature and yieldingly held in concentric relation to the axis of the wheel by a circular plate metal spring or springs that are in turn connected at intervals in their peripheries to the hub or center of the wheel, examples of which are shown in my prior Patent No. 1,025,483, of May 7, 1912, and my prior application for Letters Patent Serial No. 748,609, filed February 15, 1913. And the present improvement has for its objects: First to provide a structural formation and association of parts in the above mentioned type of wheels, in which the connecting means between the spring member of the tread and the wheel center is formed in such a way that certain portions of said spring member have constant holding engagement with certain portions of the connecting means, and that other portions of said spring member are normally removed from holding engagement with other portions of the connecting means and disposed a distance therefrom so as to come only into holding engagement therewith with the addition of a predetermined load upon the wheel and effect greater stiffness in said spring member. Second, to provide a simple and durable formation and combination of parts by means of which the pair of circular spring members of the above described type of wheels are connected to the wheel center at intervals in the circumference of the spring members in a strong and substantial manner.

In the accompanying drawings:—Figure 1, is a side elevation illustrating the preferred form of the present improvement. Fig. 2, is a detail perspective view of the same. Fig. 3, is a side elevation illustrating the improvement applied to the wheel structure forming the subject matter of my prior application Ser. No. 748,609, aforesaid. Fig. 4 is a detail perspective view of the same. Fig. 5 is an elevation, partly in section, illustrating the improvement as applied to the wheel structure forming the subject matter of my prior Patent No. 1,025,483, aforesaid. Figs. 6 and 7, are enlarged detail sections of the same on lines $x$—$x$ and $x'$—$x'$, respectively, Fig. 5. Fig. 8, is an elevation, partly in section, of a modified form of the structure shown in Fig. 5. Figs. 9 and 10, are enlarged detail sections on lines $x^2$—$x^2$ and $x^3$—$x^3$, respectively Fig. 8.

Similar reference numerals indicate like parts in the several views.

Referring to the drawings 1 represents the outer flexible annular member of the present wheel structure, comprising in detail, an inner circular spring or springs 2 of a flat band form, and a flexible tread 3 operatively associated with said spring or springs. The flexible tread 3 is formed in any usual and suitable manner, preferably by a circular series of sector shaped blocks 3′ the abutting ends or faces of which are chamfered in any usual manner to admit of an independent rocking movement of one block with relation to the adjoining blocks as the tread is changed in actual service from its normal circular form in an unloaded state, and as set forth in detail in application Ser. No. 748,609, aforesaid.

In the construction illustrated in Figs. 1, 2, 3 and 4, a plurality of approximately counterpart plate metal springs 2, arranged in spaced relation are disposed in grooves or recesses 4 in the opposite faces of the blocks 3′ and maintain said blocks in proper position. The scope of the present improvement however involves a construction in which a single circular plate metal spring 2 has bearing upon the inner circular surface of the flexible tread 3, as described in my prior Patent No. 1,025,483, and illustrated in Figs. 5, 6, 7, 8, 9 and 10, of the present drawings.

5 designates the inner or central member of the wheel structure, formed for bearing engagement with the axle or like part of the vehicle, and having any usual detail construction adapted to afford lightness and strength. Said inner member may comprise a central hub 6, and a series of radial spokes 7, as shown in Figs. 1, and 3 of the drawings, or said inner member may comprise a central hub 6', a series of radial spokes 7' and a marginal rim or felly 8, as illustrated in Fig. 5, of the drawings. In the first instance the radial spokes 7 have direct operative engagement with the circular plate metal springs 2, by means of laterally extending stop or abutment members 9 carried by said spokes and having bearing upon the peripheries of said springs. In the second instance, the marginal rim or felly 8 has direct operative engagement with the circular plate metal spring 2 by means of laterally extending stop or abutment members 9, similar to the abutments 9 just described, and carried in any usual manner by said rim or felly 8, and as shown in Figs. 5, 6 and 7 by a pair of annular side plates 10, fixedly secured to said rim or felly 8. The plates 10, as so arranged afford in addition, means to prevent lateral displacement of the flexible outer member 1 in the assembled structure.

The first part of the present invention embraces a structure in which each alternate stop or abutment 9 is disposed at a greater distance from the axis of rotation of the wheel, than that at which each next adjacent stop or abutment 9 is disposed, thus providing a concentric inner series 9' and an outer concentric series 9" of the stop lugs or abutments 9, aforesaid. With the described arrangement, in a normal condition of the wheel parts and under ordinary load stress the outer series 9" will not contact upon the periphery of the circular spring or springs 2, while the inner concentric series 9' will have constant contact against said spring or springs 2, and any local distortion or flexure of said spring or springs will take place between the adjacent pair of the inner series 9' of the lugs or abutments 9, with a comparatively large extent of the spring or springs involved and a corresponding degree of resiliency. With an excessive increase in the load on the wheel the flexed portions of the spring or springs are brought into active bearing or abutment against adjacent ones of the outer series 9" of the lugs or abutments 9, with a corresponding decrease in the extent and increase in the stiffness of the flexed portions of the spring or springs 2.

While the regular alternation of the series 9' and 9" of lugs or abutments 9, shown in the drawings is preferred for ordinary and general use, special uses of the wheel may indicate an irregular alternation of said series 9' and 9" of the lugs and the scope of the present invention embraces said irregular alternation, and in which a greater or a less number of the lugs may be used in the inner concentric series 9' than is made use of in the outer concentric series 9" of lugs or abutments 9, aforesaid. While in most applications of the present invention, the series 9' and 9" of abutment members or lugs 9, will consist of unconnected lateral lugs or ears on the parts as illustrated in Figs. 1 to 7 inclusive, it is within the scope of this part of the present invention to form the side plates 10 of the wheel structure illustrated in Figs. 5, 6 and 7, with marginal inturned webs or flanges 11, forming connections between the series of stops or abutments 9, to reinforce or strengthen the same as illustrated in Figs. 8, 9 and 10.

The second part of the present improvement involves a detail structural formation and arrangement of the abutment lugs, illustrated in Figs. 1 and 2, as follows: The main portion of the spokes 7 are preferably formed of bars of spring metal which admit of flatwise flexure and for the functions hereinafter stated. The outer ends of said main portions of the spokes 7 are in spaced relation to the inner faces of the spring members 2, to provide open spaces between the parts and so that only after a predetermined inward deflection of the adjacent portions of the spring members 2, will said depressed portions of the spring members contact with the outer ends of adjacent spokes. Any additional inward depression of the spring members will then be met with by the resiliency of said main portions of the spokes 7, as an addition to the resiliency of said spring members.

7' designate T shaped extensions or intermediate connecting members carried on the outer ends of the spokes 7 with their central shank portions disposed between the pair of circular spring members 2, and with their transverse head flanges 9 bearing upon the peripheries of said springs, as shown in Figs. 1 and 2. As so arranged the head flanges 9 provide a circumferentially spaced series of holding abutments for the circular spring members 2, to maintain said spring members and the sectional tread member 3 carried thereby normally in concentric relation to the axis of the vehicle wheel.

By the arrangement of said head flanges 9 in the spaces between contiguous tread blocks 3' as shown, any tendency on the part of the series of tread-blocks to creep, is effectively prevented.

The tendency of the spring members 2 to move laterally out of the side recesses 4 of the flexible tread member 3 may be prevented by any usual and suitable means, such as a series of elongated sectional links 11, disposed transversely in spaces between pairs of adjacent tread blocks 3' and embracing the pair of spring members 2, as shown in Figs. 1 and 2.

Having thus fully described my said invention, what I claim as new and desire to secure by Letters Patent, is:—

1. In a vehicle wheel, a wheel center, a spring member surrounding said wheel center, a flexible tread member surrounding said spring member, connecting means between the wheel center and the spring member having abutments differing in distance from the wheel axis.

2. In a vehicle wheel, the combination of an inner member carrying a plurality of circular series of stop lugs or ears, with each series differing in distance from the wheel axis, and an outer member comprising an annular flexible tread and a ring shape metal spring associated with said tread, the spring having constant peripheral abutment against the innermost stop lugs and adapted to have intermittent abutment against the outermost stop lugs, substantially as set forth.

3. In a vehicle wheel, the combination of an inner member carrying a plurality of circular series of stop lugs or ears, with each series differing in distance from the wheel axis and with the lugs of one series having regular alternation with the lugs of the other series and an outer member comprising an annular flexible tread and a ring shape metal spring associated with said tread, the spring having constant peripheral abutment against the innermost stop lugs and adapted to have intermittent abutment against the outermost stop lugs, substantially as set forth.

4. In a vehicle wheel, the combination of an inner member, a plurality of series of radially disposed connecting members carried by said inner member, with each series differing in radial length, a sectional tread member formed with grooves in its opposite sides, and ring shape metal springs disposed in the grooves of the tread member with their peripheries adapted for operative engagement with the outer portions of the connecting members aforesaid substantially as set forth.

5. In a vehicle wheel, the combination of a hub, a series of spokes, a plurality of series of radially disposed connecting members carried on the outer ends of said spokes, with each series differing in radial length, a sectional tread member formed with grooves in its opposite sides, plate metal springs of an annular form disposed in the grooves of the tread member with their peripheries adapted for abutting engagement with the outer portions of the aforesaid connecting members, substantially as set forth.

6. In a vehicle wheel, the combination of an inner member, a plurality of series of radially disposed T shaped connecting members carried by said inner member, with each series differing in radial length, a sectional tread member formed with grooves in its opposite sides, ring shape metal springs disposed in the grooves of the tread member with their peripheries adapted for abutting engagement with the transverse extensions of the aforesaid connecting members, substantially as set forth.

7. In a vehicle wheel, the combination of a hub, a series of spokes, a plurality of series of radially disposed T shaped connecting members carried by said inner member, with each series differing in radial length, a sectional tread member formed with grooves in its opposite sides, ring shape metal springs disposed in the grooves of the tread member with their peripheries adapted for abutting engagement with the transverse extensions of the aforesaid connecting members, substantially as set forth.

8. In a wheel, the combination of a wheel center, a series of radially disposed T shaped connecting members carried by said wheel center, a sectional tread member formed with grooves in its opposite sides, and ring shape metal springs disposed in the side grooves of the tread member with their peripheries abutting against the transverse extensions of the connecting members aforesaid, substantially as set forth.

9. In a wheel, the combination of a hub, a series of spokes, a series of radially disposed connecting members carried on the outer ends of said spokes, a sectional tread member formed with grooves in its opposite sides, and ring shape metal springs disposed in the side grooves of the tread member with their peripheries having operative engagement with the outer portions of the connecting members aforesaid, the outer ends of the spokes, having spaced relation to the inner surface of the springs and adapted to limit the inward flexure of the same, substantially as set forth.

10. In a wheel, the combination of a hub, a series of spokes, a series of radially disposed T shaped connecting members carried on the outer ends of said spokes, a sectional tread member formed with grooves in its opposite sides, and ring shape metal springs disposed in the side grooves of the tread member with their peripheries abutting against the transverse extensions of the connecting members aforesaid, substantially as set forth.

11. In a wheel, the combination of a wheel center, a series of radially disposed connecting members formed with transverse extensions on their outer portions and carried by said wheel center, a sectional tread member formed with grooves in its opposite sides, ring shape metal springs disposed in the side grooves of the tread member, the stem of the connecting members passing between the said spring members and with the peripheries of said spring members abutting against the transverse extensions of the said connecting members, and means for holding said spring members and each section of said tread member in working relation, substantially as set forth.

Signed at Chicago, Illinois, this 13th day of February, 1915.

THOMAS RHODUS.

Witnesses:
 ROBERT BURNS,
 IVA L. CRANE.

Copies of this patent may be obtained for five cents each, by addressing the "Commissioner of Patents, Washington, D. C."